United States Patent
Yan et al.

(10) Patent No.: US 8,935,115 B2
(45) Date of Patent: Jan. 13, 2015

(54) METHOD AND APPARATUS FOR COMPENSATING NONLINEAR DAMAGE

(75) Inventors: Weizhen Yan, Beijing (CN); Zhenning Tao, Beijing (CN); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 13/412,176

(22) Filed: Mar. 5, 2012

(65) Prior Publication Data
US 2012/0290244 A1    Nov. 15, 2012

(30) Foreign Application Priority Data
Mar. 4, 2011    (CN) .......................... 2011 1 0052862

(51) Int. Cl.
G06F 19/00    (2011.01)
H04B 10/255    (2013.01)
H04B 10/69    (2013.01)

(52) U.S. Cl.
CPC .......... H04B 10/255 (2013.01); H04B 10/6971 (2013.01)
USPC .......................................................... 702/86

(58) Field of Classification Search
USPC .......................................... 702/86, 182–185
See application file for complete search history.

(56) References Cited

U.S. PATENT DOCUMENTS

| | | |
|---|---|---|
| 2001/0033238 A1 | 10/2001 | Velazquez |
| 2004/0233083 A1 | 11/2004 | Temerinac et al. |
| 2013/0077979 A1* | 3/2013 | Dou et al. ............... 398/192 |

FOREIGN PATENT DOCUMENTS

EP    2034637    3/2009

OTHER PUBLICATIONS

Chinese Office Action issued May 6, 2014 in corresponding Chinese Patent Application No. 201110052862.5.
Extended European Search Report dated May 10, 2012 issued in corresponding European Patent Application No. 12150907.9.
I. Papagiannakis et al., "Electronic distortion compensation in the mitigation of optical transmission impairments: the view of joint project on mitigation of optical transmission impairments by electronic means ePhoton/ONe+ project", IET Optoelectronics, vol. 3, Issue 2, 2009, pp. 73-85.
Johan Stigwall et al., "Signal Reconstruction by Phase Retrieval and Optical Backpropagation in Phase-Diverse Photonic Time-Stretch Systems", Journal of Lightwave Technology, vol. 25, No. 10, Oct. 2007, pp. 3017-3027.
Xing Wei, "Power-weighted dispersion distribution function for characterizing nonlinear properties of long-haul optical transmission links", Optics Letters, vol. 31, No. 17, Sep. 2006, pp. 2544-2546.
Shoichiro Oda et al., "112 Gb/s DP-QPSQ Transmission Using a Novel Nonlinear Compensation in Digital Coherent Receiver", OSA/OFC/NFOEC, 2009, pp. 1-3.

(Continued)

Primary Examiner — Edward Raymond
(74) Attorney, Agent, or Firm — Staas & Halsey LLP

(57) ABSTRACT

A method and apparatus for compensating nonlinear damage are disclosed. The method for compensating nonlinear damage, including: determining an additive parameter indicating an amount of nonlinear damage based on a plurality of sampled signal sets among which a sampling time of an input signal varies according to different time; and subtracting the additive parameter from the input signal.

10 Claims, 11 Drawing Sheets

(56) References Cited

OTHER PUBLICATIONS

Antonio Mecozzi et al., "Analysis of Intrachannel Nonlinear Effects in Highly Dispersed Optical Pulse Transmission", IEEE Photonics Technology Letters, vol. 12, No. 4, Apr. 2000, pp. 392-394.

Lei Li et al., "Implementation Efficient (0.25 stage/span) Nonlinear Equalizer Based on Digital Backpropagation of Multi-span Uncompensated Link", pp. 1-3, Jan. 2010.
Ezra Ip et al., "Compensation of Dispersion and Nonlinear Impairments Using Digital Backpropagation", Journal of Lightwave Technology, vol. 26, No. 20, Oct. 2008, pp. 3416-3425.

\* cited by examiner

METHOD AND APPARATUS FOR COMPENSATING NONLINEAR DAMAGE

CROSS REFERENCE TO RELATED APPLICATIONS

This application claims the benefit of Chinese Application No. 201110052862.5, filed Mar. 4, 2011, the disclosure of which is incorporated herein by reference.

TECHNICAL FIELD

The embodiments relate to coherent-light communication, especially to the nonlinear damage compensation in a polarization coherent-light communication system.

BACKGROUND

The phase noise and waveform damage resulting from Self-Phase Modulation (SPM) or intra-channel nonlinearity is one of the major sources that cause the high cost of long distance transmission light communication system. In a coherent-light communication system, it may utilize a digital Back-Propagation (BP) unit of a coherent receiver to compensate the nonlinear damage of a self-phase modulation. Similarly, nonlinear damage of back-propagation may be compensated in a transmitter, by transmitting a pre-compensated light signal, it counterbalances the nonlinear damage caused by an optical fiber transmission link.

FIG. 1 schematically illustrates a block diagram of a receiver adopting a reverse transmission technique. As shown in FIG. 1, in a receiver adopting a BP technique, a BP unit makes a BP process on the signal that has been front end processed. As a BP unit is mainly used for nonlinear compensation, herein it also is referred to as nonlinear damage compensation apparatus. Usually a receiver includes a plurality of tandem BP units (illustrated as xM in the Figure), that is, a receiver has M stages of BP units. As shown in FIG. 1, each stage of BP unit comprises a chromatic dispersion compensator (CDC) and a nonlinear compensator (NLC). A CDC is used for compensating linear damage, i.e. chromatic dispersion damage; An NLC is used for compensating nonlinear damage, i.e. self-phase modulation damage. The other devices in FIG. 1, including an equalizer, a polarization demultiplexer, a frequency offset compensation device, a phase recovery device, and a data recovery device are well known in the art. The constructs thereof may refer to patent Chinese patent application "Frequency offset compensating apparatus and method, and light coherent receiver" (inventor: Lei LI, Chinese application No.: 200710196347.8) and "Phase error estimator and phase error estimating method" (inventor: Zhenling TAO, Chinese application No.: 200710188795.3), which are hereby incorporated by reference herein.

FIG. 2 illustrates a structure of a nonlinear compensator. As shown in FIG. 2, a nonlinear compensator (NLC) includes two parts, one is a nonlinear damage calculator, and the other is a nonlinear damage eliminator. The nonlinear damage calculator is used for calculating various nonlinear damages; the nonlinear damage eliminator utilizes the output of the nonlinear damage calculator to eliminate the nonlinear damage in signals.

FIG. 3 illustrates a structure of a nonlinear damage calculator in a conventional NLC. The sum of signal instantaneous power is severed or sampled as a measurement of nonlinear damage, recorded as $\phi(t)$. FIG. 4 illustrates a structure of a nonlinear damage eliminator in a conventional NLC. After undergoing an exponent operation, the nonlinear damage $\phi(t)$ calculated by FIG. 3 is multiplied by X polarization state and Y polarization state of signals respectively so as to eliminate the nonlinear damage. As it finally uses a multiplication operation to eliminate the nonlinear damage, $\phi(t)$ may be referred to as a multiplicative parameter.

FIG. 5 illustrates a structure of an improved conventional nonlinear damage calculator. After a weighted mean, the sum of signal instantaneous power is severed or sampled as a measurement of nonlinear damage. For the nonlinear damage measurement calculated by the nonlinear damage calculator, it may also be eliminated by the nonlinear damage eliminator that is similar to that in FIG. 4.

The shortcoming of these conventional reverse transmission methods are in that the accuracy thereof is not high, and too many stages are needed, which cause the actual polarization communication system to be difficult to achieve.

Here is a list of references that are beneficial for understanding the embodiments; they are hereby incorporated by reference as they fully set forth herein.

1, Ezra Ip, JLT, vol 26, no 20, pp 3416 (2008);
2, Shoichiro Oda, OFC2009, paper OThR6
3, X. Wei, Opt. Lett., vol 31, no 17, pp 2544 (2006);
4, A. Mecozzi, PTL, vol 12, no 4, pp 392 (2000);
5, Lei Li, OFC2011, paper OWW3

SUMMARY OF THE INVENTION

The embodiments are proposed in view of the foregoing problems in the conventional art, and aims to remove or reduce one or more problems due to restrictions and defects of the conventional technology, at least providing a beneficial choice.

In order to achieve the above object, according to one aspect of the embodiments, there is provided a method for compensating nonlinear damage, comprising determining an additive parameter indicating an amount of nonlinear damage based on a plurality of sampled signal sets among which a sampling time of an input signal varies according to different time; and subtracting the additive parameter from the input signal. In one embodiment, the method further comprises a delaying step, which delays the input signal. Under this circumstance, the subtracting subtracts the additive parameter from the delayed input signal.

According to another aspect of the embodiments, there is provided an apparatus for compensating nonlinear damage, comprising: an additive parameter determining unit configured to determine an additive parameter indicating an amount of nonlinear damage, based on a plurality of sampled signal sets in which a sampling time of an input signal varies according to different time; and a subtracting unit configured to subtract the additive parameter from the input signal. In one embodiment, the method further comprises a delaying unit, which delays the input signal. Under this circumstance, the subtracting unit subtracts the additive parameter from the delayed input signal.

The embodiments provide a time domain and polarization combined processing method and apparatus for compensating nonlinear damage. By calculating additive interference of each stage of BP unit, and subtracting them from input signals, it can achieve the same performance by using less stages of BP units so as to further decrease complexity.

It should be noted that terms "comprise/comprising", "include/including" when used in this specification is taken to specify the presence of stated features, integer, steps or elements but does not preclude the presence or addition one or more other stated features, integers, steps or elements.

The foregoing general description and the following detailed description with reference to the drawings are illustrative, rather than restrictive to the scope of the embodiments.

BRIEF DESCRIPTION OF THE DRAWINGS

The above and other objects, features and advantages could be clearly understood with reference to the description and together with the drawings. In the drawings.

DESCRIPTION OF EMBODIMENT

Descriptions are given to embodiments with reference to the accompanying drawings; drawings and these descriptions are illustrative, rather than restrictive to the protection scope.

The nonlinear damage calculating method and the nonlinear damage eliminating method discussed herein is applicable but not limited to various modulating formats such as mPSK, mQAM, mAPSK etc, and sub-carrier multiplexing or OFDM technology.

Figure 1:
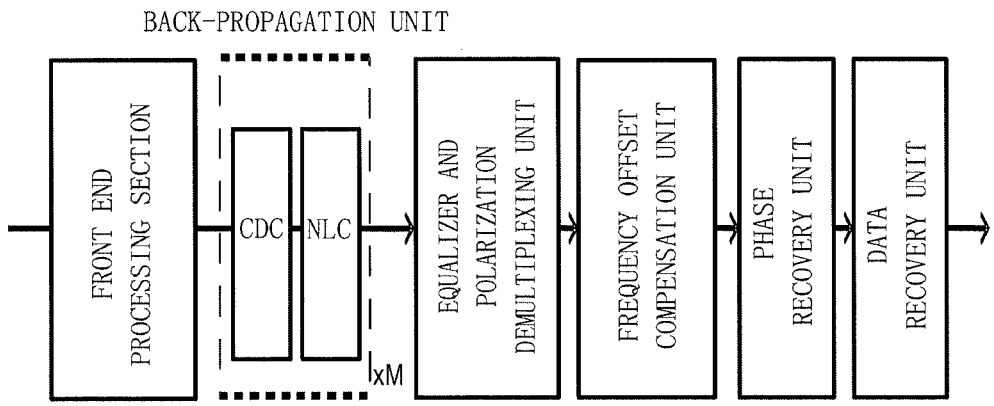
FIG. 1 schematically illustrates a block diagram of a receiver adopting a Back Propagation technique.
Figure 2:
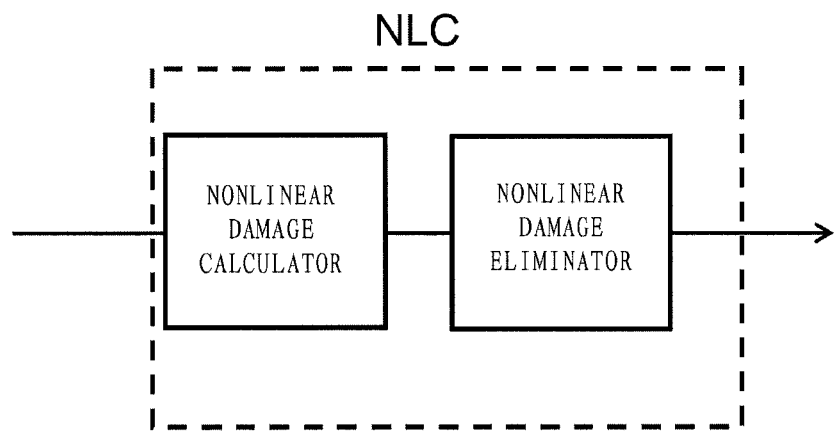
FIG. 2 illustrates a structure of a nonlinear compensator (NLC)
Figure 3:
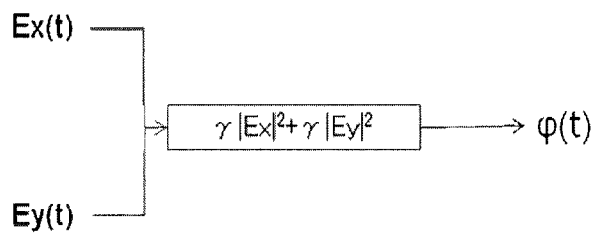
FIG. 3 illustrates a structure of a nonlinear damage calculator in a conventional NLC.
Figure 4:
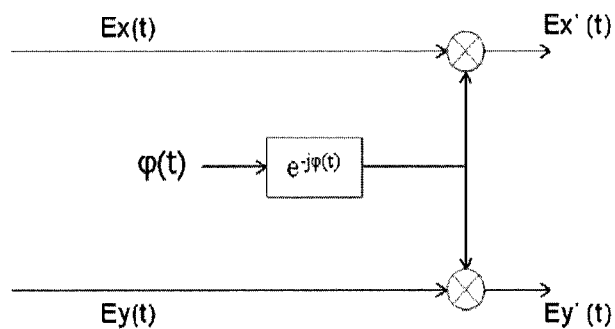
FIG. 4 illustrates a structure of a nonlinear damage eliminator in a conventional NLC.
Figure 5:
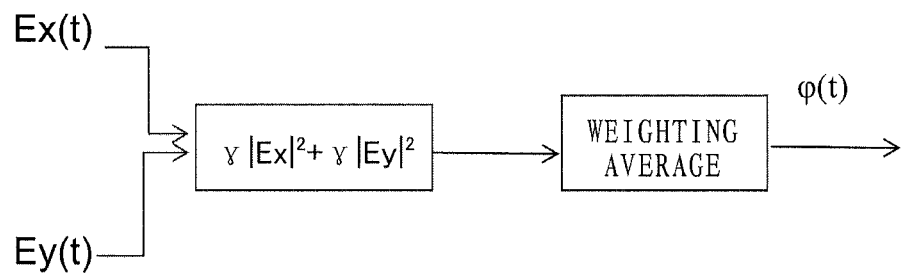
FIG. 5 illustrates a structure of an improved conventional nonlinear damage calculator.
Figure 6:
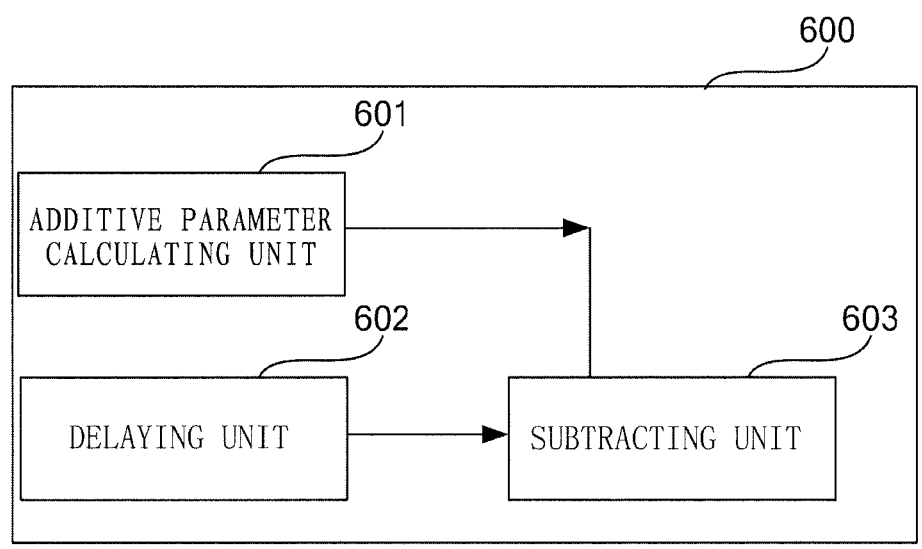
FIG. 6 illustrates a schematic structural block diagram of a nonlinear compensator according to an embodiment.

FIG. 6 illustrates a schematic structural block diagram of a nonlinear compensator according to an embodiment;

As shown in FIG. 6, nonlinear compensator 600 according to an embodiment comprises an additive parameter calculating unit 601, a delaying unit 602 and a subtracting unit 603.

The additive parameter calculating unit 601 utilizes multiple group sampling signals of input signals to determine an additive parameter. The delaying unit 602 delays the input signals, and the subtracting unit 603 subtracts the additive parameter from the delayed input signals.

Figure 7:
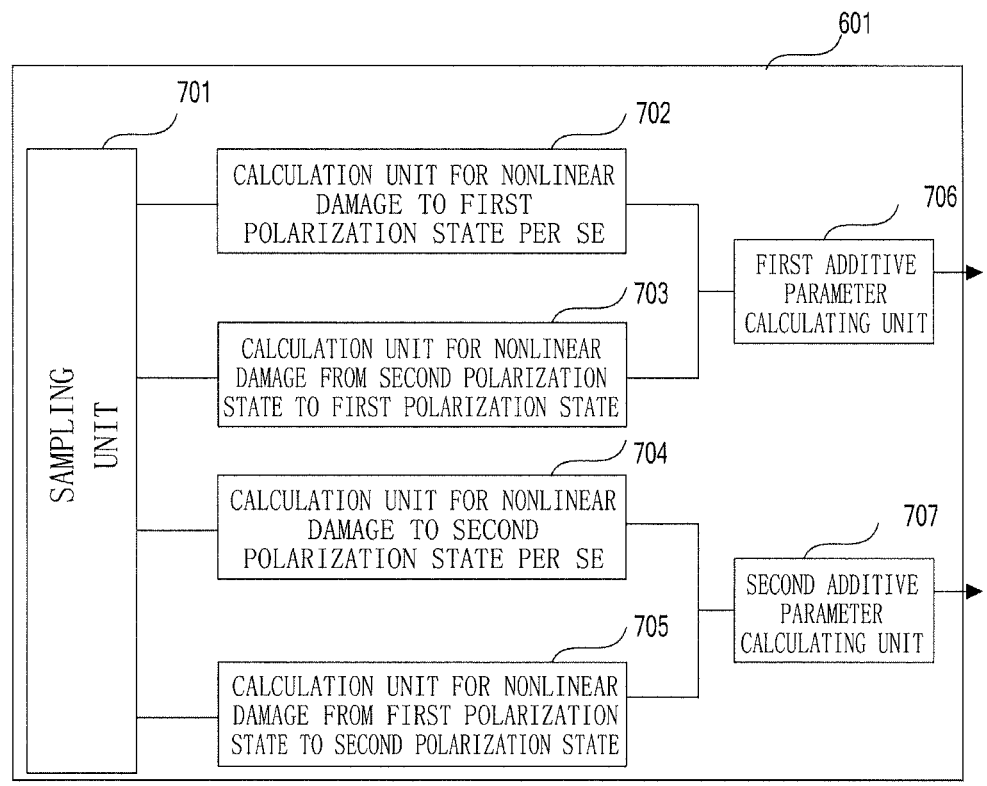
FIG. 7 illustrates a schematic diagram of an additive parameter calculation unit according to an embodiment.

Hereafter a description to the additive parameter calculating unit 601 will be given. FIG. 7 illustrates a schematic diagram of an additive parameter calculation unit according to an embodiment.

According to an embodiment, the additive parameter calculating unit 601 comprises a sampling unit 701, a calculation unit for nonlinear damage to a first polarization state per se 702, a calculation unit for nonlinear damage from a second polarization state to the first polarization state 703, a calculation unit for nonlinear damage to the second polarization state per se 704, a calculation unit for nonlinear damage from the first polarization state to the second polarization state 705, a first summator 706, and a second summator 707.

According to an embodiment, a sampling unit 701 is configured to acquire a plurality of first time samples and a plurality of second time samples under a first polarization state, as well as a plurality of first time samples and a plurality of second time samples under a second polarization state, where the plurality of first time samples under the first polarization state are samples of signals under the first polarization state whose sampling time varies according to a first time, the plurality of second time samples under the first polarization state are samples of signals under the first polarization state whose sampling time varies according to a second time, the plurality of first time samples under the second polarization state are samples of signals under the second polarization state whose sampling time varies according to the first time, the plurality of second time samples under the second polarization state are samples of signals under the second polarization state whose sampling time varies according to the second time, and there is a certain functional relation between the first time and the second time.

The calculation unit for nonlinear damage to the first polarization state per se 702 is configured to calculate a nonlinear damage to the first polarization state per se by processing the plurality of first time samples and the plurality of second time samples under the first polarization state.

The calculation unit for nonlinear damage from the second polarization state to the first polarization state 703 is configured to calculate a nonlinear damage from the second polarization state to the first polarization state by processing the plurality of first time samples and the plurality of second time samples under the first polarization state as well as the plurality of first time samples and the plurality of second time samples under the second polarization state.

The calculation unit for nonlinear damage to the second polarization state per se 704 is configured to calculate a nonlinear damage to the second polarization state per se by processing the plurality of first time samples and the plurality of second time samples under the second polarization state;

The calculation unit for nonlinear damage from the first polarization state to the second polarization state 705 is configured to calculate a nonlinear damage from the first polarization state to the second polarization state by processing the plurality of first time samples and the plurality of second time samples under the first polarization state as well as the plurality of first time samples and the plurality of second time samples under the second polarization state.

In one embodiment, the sampling unit collects two groups of signals at time points that varies according to a time variable t1. The calculation unit for nonlinear damage to the first polarization state per se 702 calculates the nonlinear damage to the first polarization state per se according to an equation $$j\gamma \sum_{t1} h(t_1) \times Ex^2(t+t_1)Ex^*(t+2t_1),$$

wherein * represents a conjugation and h(t) is a weighting coefficient; which could be calculated in advance according to a link situation. For instance, the weighting coefficient may be calculated in advance according to A. Mecozzi, PTL, vol 12, no 4, pp 392 (2000) and X. Wei, Opt. Lett., vol 31, no 17, pp 2544 (2006). γ is a nonlinear coefficient and j represents imaginary part.

The calculation unit for nonlinear damage from the second polarization state to the first polarization state 703 calculates the nonlinear damage from the second polarization state to the first polarization state according to an equation $$j\gamma \sum_{t1} h(t_1) \times Ex(t+t_1)Ey(t+t_1)Ey^*(t+2t_1).$$

The calculation unit for nonlinear damage to the second polarization state per se 704 calculates the nonlinear damage to the second polarization state per se according to an equation $$j\gamma \sum_{t1} h(t_1) \times Ey^2(t+t_1)Ey^*(t+2t_1).$$

The calculation unit for nonlinear damage from the first polarization state to the second polarization state 705 calculates the nonlinear damage from the first polarization state to the second polarization state according to an equation $$j\gamma \sum_{t1} h(t_1) \times Ey(t+t_1)Ex^*(t+2t_1).$$

A first summator 706 (the first additive parameter calculating unit) adds the nonlinear damage to the first polarization state per se with the nonlinear damage from the second polarization state to the first polarization state, to form a first additive parameter; a second summator 707 (the second additive parameter calculating unit) adds the nonlinear damage to the second polarization state per se with the nonlinear damage from the first polarization state to the second polarization state, to form a second additive parameter.

Figure 8:
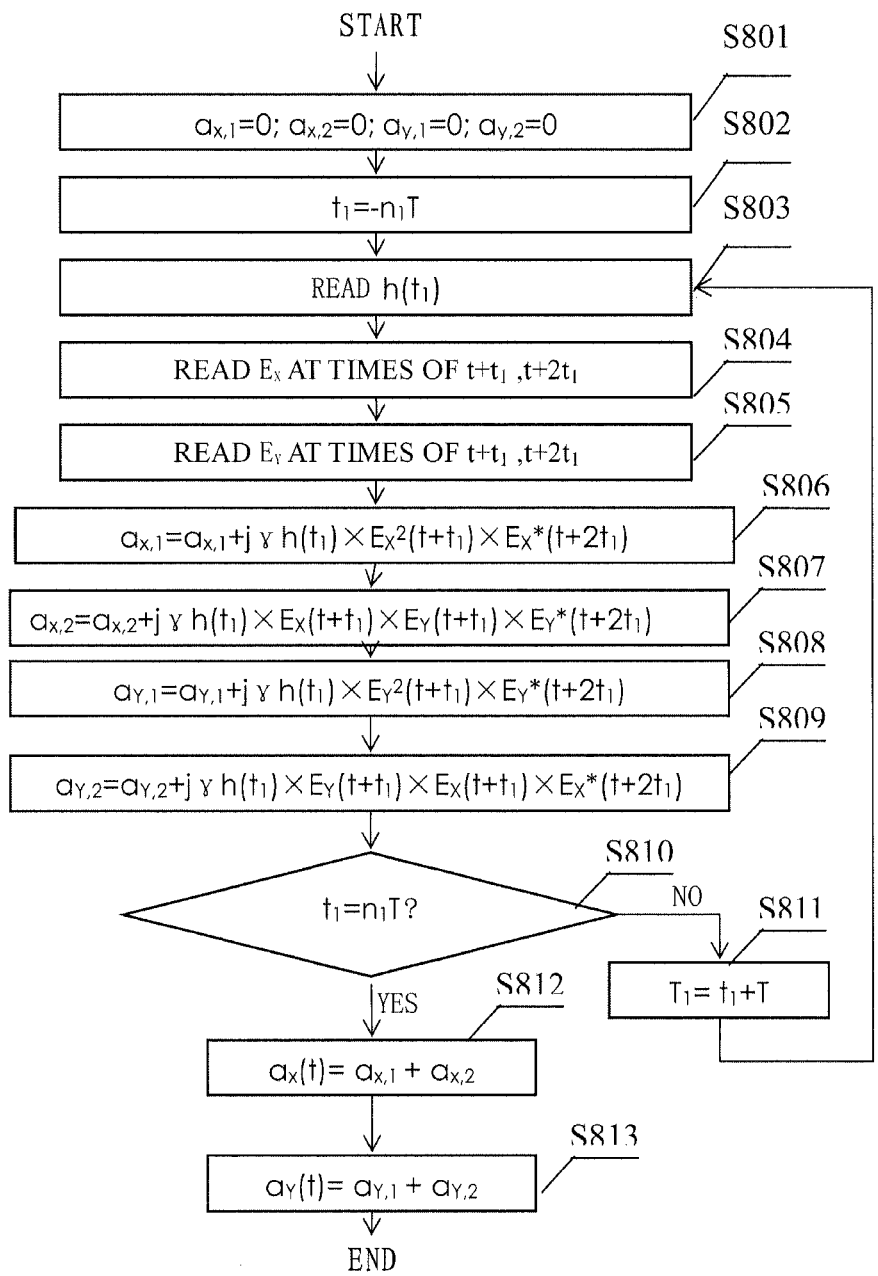
FIG. 8 illustrates a flowchart for calculation of the additive parameter calculation unit according to an embodiment.

FIG. 8 illustrates a flowchart for calculation of the additive parameter calculation unit 601 according to this embodiment. As shown in FIG. 8, initial parameter values are set in step S801. Specifically, each of the nonlinear damage to the first polarization state per se $a_{x,1}$, nonlinear damage from the second polarization state to the first polarization state $a_{x,2}$, nonlinear damage to the second polarization state per se $a_{y,1}$, nonlinear damage from the first polarization state to the second polarization state $a_{y,2}$ is set to zero. Then, a sampling amount is set at step S802, the sampling amount being the total number that each group needs to sample. In the example of the figure, the total number that each group needs to sample is set as 2n+1, n is a predetermined positive integer, T in the figure is a sampling interval. It may be clearer by further referring to S810. Then, current weighting coefficient h(t) is read at step S803, and at step S804, the first polarization signals Ex whose sampling time points are t+t1, t+2t1 respectively, are read. That is, two samples of the first polarization signal are collected. Meanwhile or in sequence, at step S805, the second polarization signals Ey whose sampling time points are t+t1, t+2t1 respectively, are read. That is, two samples of the second polarization signal are collected. At step S806-S809, the calculations according the foregoing individual formula are performed and the calculation results are added to the respective current value. It is determined, at step S810 whether or not the predetermined amount or number of samples have been calculated, or whether or not the predetermined amount of samples have been sampled. If not, a next sampling time point is acquired at step S811 and the flow returns back to S803. If yes, at step S812, the calculated nonlinear phase damage $a_{x,1}$ and the calculated first nonlinear crosstalk $a_{x,2}$ are added and at step S813, the calculated second nonlinear phase damage $a_{y,1}$ and the calculated second nonlinear crosstalk $a_{y,2}$ are added, hereby acquiring the first polarization additive parameter and the second polarization additive parameter.

In this embodiment, the second time is twice the first time, obviously, there may be other functional relations between the first time and the second time. As there is a functional relation between the first time and the second time, thus may be only one time variable.

According to another embodiment, the sampling unit 701 further acquires signals under the first polarization state and signals under the second polarization state of the current time. The sampling unit collects two groups of plurality of signals at a time point that varies according to a time variable t1. The calculation unit for nonlinear damage to the first polarization state per se 702 calculates the nonlinear damage to the first polarization state per se according to an equation $$j\gamma \sum_{t1} h(t_1) \times Ex(t+t_1)Ex(t-t_1)Ex^*(t),$$

The calculation unit for nonlinear damage from the second polarization state to the first polarization state 703 calculates the nonlinear damage from the second polarization state to the first polarization state according to an equation $$j\gamma \sum_{t1} h(t_1) \times Ex(t+t_1)Ey(t-t_1)Ey^*(t);$$

the calculation unit for nonlinear damage to the second polarization state per se 704 calculates the nonlinear damage to the second polarization state per se according to an equation $$j\gamma \sum_{t1} h(t_1) \times Ey(t+t_1)Ey(t-t_1)Ey^*(t);$$

the calculation unit for nonlinear damage from the first polarization state to the second polarization state 705 calculates the nonlinear damage from the first polarization state to the second polarization state according to an equation $$j\gamma \sum_{t1} h(t_1) \times Ey(t+t_1)Ex(t-t_1)Ex^*(t).$$

A first summator 706 adds the nonlinear damage to the first polarization state per se with the nonlinear damage from the second polarization state to the first polarization state, to form a first additive parameter; a second summator 707 adds the nonlinear damage to the second polarization state per se with the nonlinear damage from the first polarization state to the second polarization state, to form a second additive parameter.

Figure 9:
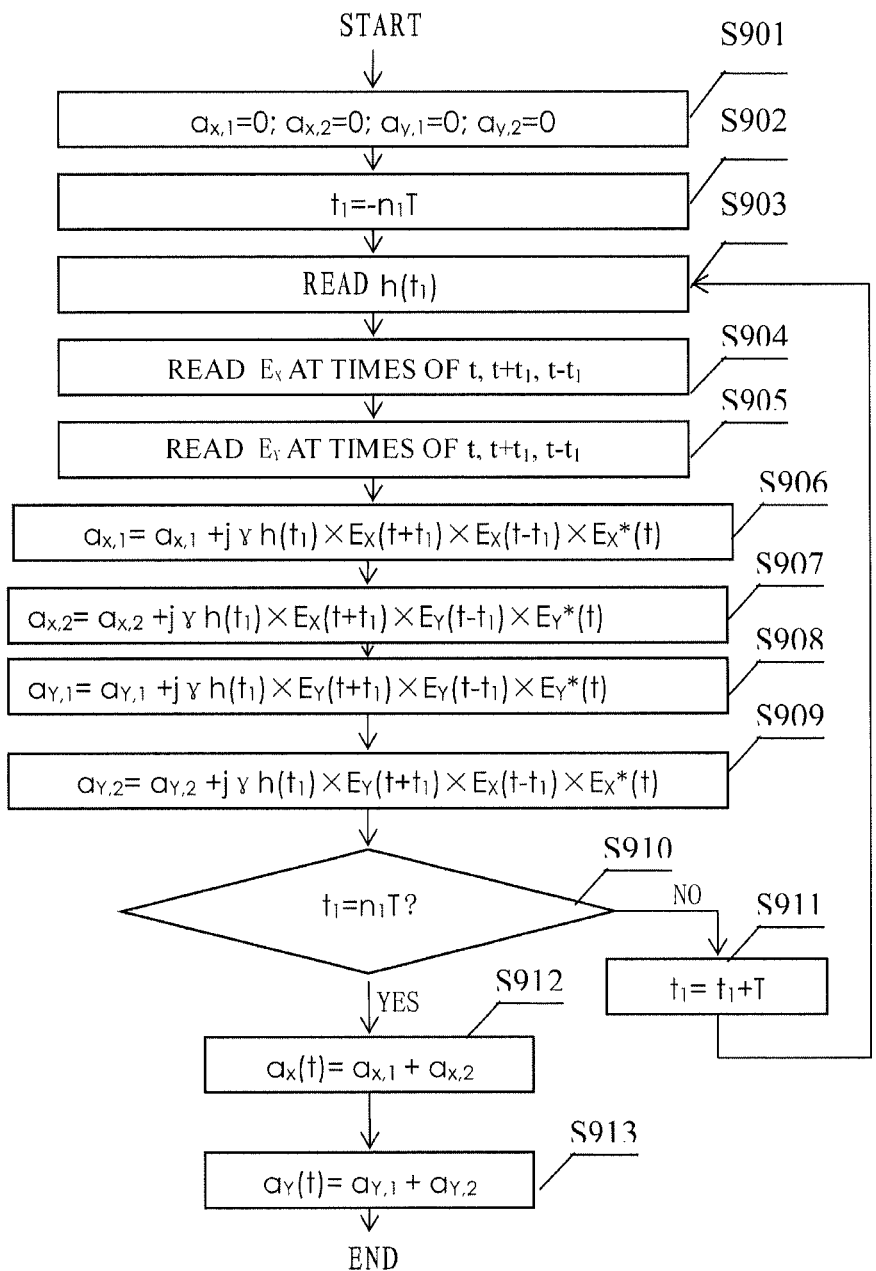
FIG. 9 illustrates a flowchart for calculation of the additive parameter calculation unit according to another embodiment.

FIG. 9 illustrates a flowchart for calculation of the additive parameter calculation unit 601 according to this embodiment. As shown in FIG. 9, the initial parameter values are set in step S901. Specifically, The nonlinear damage to the first polarization state per se $a_{x,1}$, the nonlinear damage from the second polarization state to the first polarization state $a_{x,2}$, the nonlinear damage to the second polarization state per se $a_{y,1}$, the nonlinear damage from the first polarization state to the second polarization state $a_{y,2}$ each is set as zero. Then, the sampling amount, i.e. the total number that each group needs to sample, is set at step S902. In the example of the figure, actually the total number that each group needs to sample is set as 2n+1, n is a predetermined positive integer, T in the figure is sampling interval. It may be clearer by further referring to S910. Next, the current weighting coefficient h(t1) is read at step S903. At step S904, the first polarization signal Ex whose sampling time points are t+t1, t−t1 respectively is read, Meanwhile or in sequence, at step S905, the second polarization signals Ey whose sampling time points are t+t1, t−t1 respectively are read. Calculations according to the foregoing individual formula are performed at step S906~S909, and the calculation results are added on the respective current value. Then at step S910, it is determined whether or not a predetermined amount or number of samples have been calculated, or whether or not the predetermined amount of samples have been sampled. If not, acquiring a next sampling time point at step S911 and the flow returns back to S903. If yes, at step S912, the calculated first nonlinear damage $a_{x,1}$ and the calculated first nonlinear damage $a_{x,2}$, are added and at step S913, the calculated nonlinear damage $a_{y,1}$ and the calculated nonlinear damage $a_{y,2}$ are added hereby obtaining the first polarization additive parameter and the second polarization additive parameter.

In this embodiment, the second time and the first time is a symmetric relation, i.e. the second time is −1 times the first time.

According to another embodiment, a sampling unit 701 acquires a plurality of first time samples, a plurality of second time samples and a plurality of third time samples under a first polarization state, as well as a plurality of first time samples, a plurality of second time samples and a plurality of third time samples under a second polarization state, where the plurality of first time samples under the first polarization state are samples of signals under the first polarization state whose sampling time varies according to a first time, the plurality of second time samples under the first polarization state are samples of signals under the first polarization state whose sampling time varies according to a second time, the plurality of third time samples under the first polarization state are samples whose sampling time varies according to the first time+ the second time, the plurality of first time samples under the second polarization state are samples of signals under the second polarization state whose sampling time varies according to the first time, the plurality of second time samples under the second polarization state are samples of signals under the second polarization state whose sampling time varies according to the second time, the plurality of third time samples under the second polarization state are samples whose sampling time varies according to the first time+ the second time. There is or is not a certain functional relation between the first time and the second time, i.e. the first time and the second time are independent from each other, the sampling number of them may be the same or not.

The calculation unit for nonlinear damage to first polarization state per se 702 is configured to calculate a nonlinear damage to the first polarization state per se by processing the plurality of first time samples, the plurality of second time samples and the plurality of third time samples under the first polarization state.

The calculation unit for nonlinear damage from second polarization state to first polarization state 703 is configured to calculate a nonlinear damage from the second polarization state to the first polarization state by processing the plurality of first time samples, the plurality of second time samples and the plurality of third time samples under the first polarization state as well as the plurality of first time samples, the plurality of second time samples and the plurality of third time samples under the second polarization state.

The calculation unit for nonlinear damage to second polarization state per se 704 is configured to calculate a nonlinear damage to the second polarization state per se by processing the plurality of first time samples, the plurality of second time samples and the plurality of third time samples under the second polarization state.

The calculation unit for nonlinear damage from first polarization state to second polarization state 705 is configured to calculate a nonlinear damage from the first polarization state to the second polarization state by processing the plurality of first time samples, the plurality of second time samples and the plurality of third time samples under the first polarization state as well as the plurality of first time samples, the plurality of second time samples and the plurality of third time samples under the second polarization state.

The calculation unit for nonlinear damage to first polarization state per se 702 calculates the nonlinear damage to the first polarization state per se according to an equation $$j\gamma \sum_{t1} \sum_{t2} h(t_1, t_2) \times Ex(t+t_1)Ex(t+t_2)Ex^*(t+t_1+t_2).$$

The calculation unit for nonlinear damage from second polarization state to first polarization state 703 calculates the nonlinear damage from the second polarization state to the first polarization state according to an equation $$j\gamma \sum_{t1} \sum_{t2} h(t_1, t_2) \times Ex(t+t_1)Ey(t+t_2)Ey^*(t+t_1+t_2).$$

The calculation unit for nonlinear damage to second polarization state per se 704 calculates the nonlinear damage to the second polarization state per se according to an equation $$j\gamma \sum_{t1} \sum_{t2} h(t_1, t_2) \times Ey(t+t_1)Ey(t+t_2)Ey^*(t+t_1+t_2).$$

The calculation unit for nonlinear damage from first polarization state to second polarization state 705 calculates the nonlinear damage from the first polarization state to the second polarization state according to an equation $$j\gamma \sum_{t1} h(t_1) \times Ey(t+t_1)Ey(t-t_1)Ey^*(t).$$

A first summator 706 adds the nonlinear damage to the first polarization state per se with the nonlinear damage from the second polarization state to the first polarization state, to form a first additive parameter; a second summator 707 adds the nonlinear damage to the second polarization state per se with the nonlinear damage from the first polarization state to the second polarization state, to form a second additive parameter.

Figure 10:
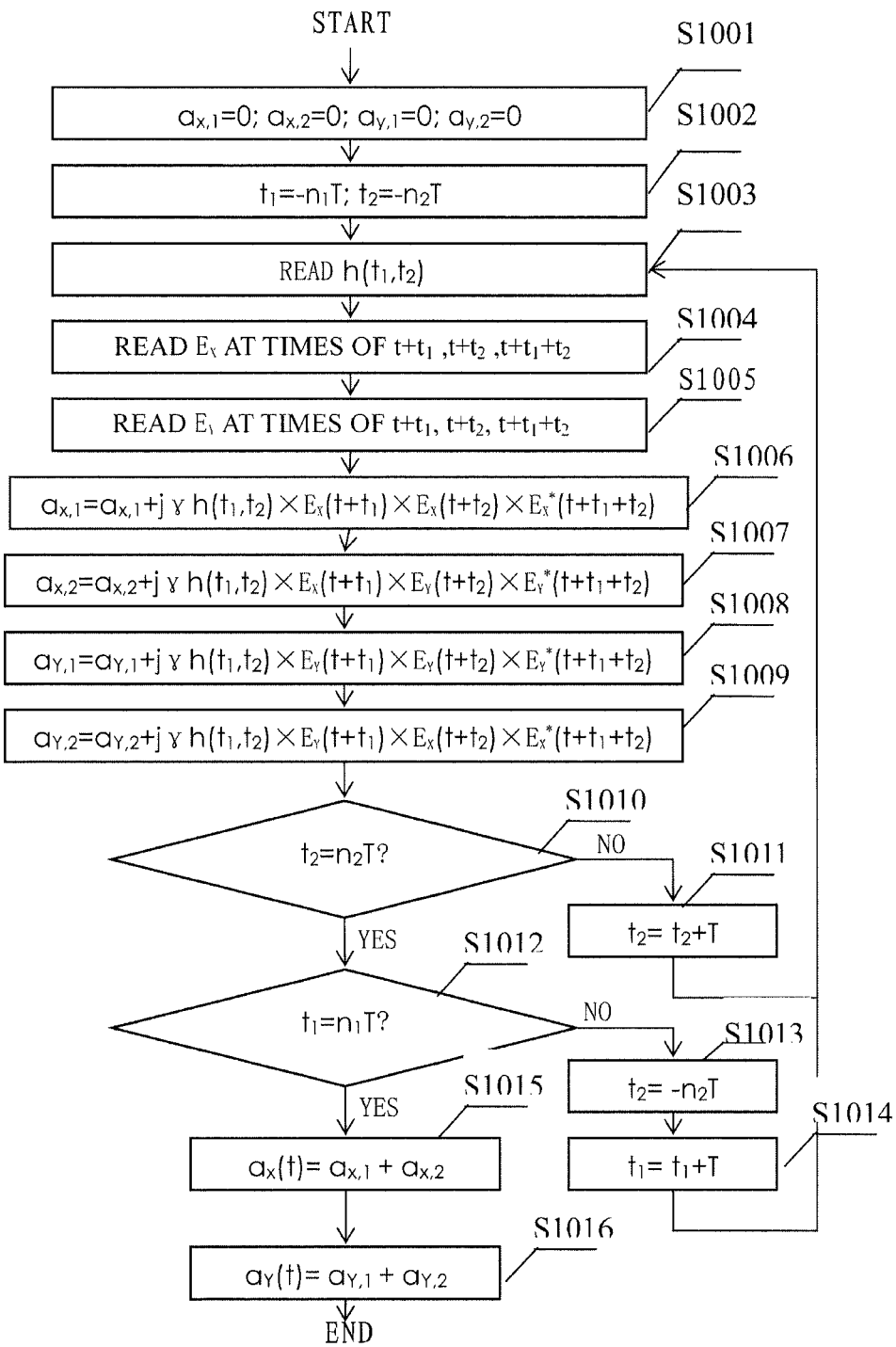
FIG. 10 illustrates a flowchart for calculation of the additive parameter calculation unit according to still another embodiment.

FIG. 10 illustrates a flowchart for calculation of the additive parameter calculation unit 601 according to this embodiment. As shown in FIG. 10, the initial parameter values are set at step S1001. Specifically, the nonlinear damage to the first polarization state per se $a_{x,1}$, the nonlinear damage from the second polarization state to the first polarization state $a_{x,2}$, the nonlinear damage to the second polarization state per se $a_{y,1}$, the nonlinear damage from the first polarization state to the second polarization state $a_{y,2}$ each is set as zero. Then, the sampling amounts (i.e. the total number that each group needs to sample) are set at step S902. In the example of the figure, the total number that each group needs to sample is set as $2n_1+1$, where $n_1$ is a predetermined positive integer, T in the figure is sampling interval. It may be clearer by combining S1010 and S1015. Next, current weighting coefficient h(t1, t2) is read at step S1003. The first polarization signals Ex whose sampling time points are t+t1, t+t2,t+t1+t2 respectively are read at step S1004, Meanwhile or in sequence, at step S905, the second polarization signals Ey whose sampling time points are t+t1, t+t2,t+t1+t2 respectively are read. Calculations according to the foregoing individual formula are performed at step S1006~S1009, and the calculation results are added on or to the respective current value. Then, at step S1010, it is determined for current first time sample, whether or not a predetermined amount $(2n_2+1)$ of second time samples have been calculated, or whether or not the predetermined number $(2n_2+1)$ of second time samples have been sampled. If not, a sampling time point of the next second time sample is acquired at step S1011 and the flow returns back to S1003. If yes, at step S1012, it is determined whether or not a predetermined amount of first time sampling points have been sampled, or whether or not the predetermined amount $(2n_1+1)$ first time sampling point have been sampled. If not, at step S1013, the number of sampled second time sample (relating to the first second time sample time point) is reset to zero, and at step S1014, the number of the first time sample is increased (increasing the sampling time of the first time sample), and the flow returns back to S1003. If yes, at step S1015, the calculated nonlinear damage $a_{x,1}$ and the calculated nonlinear damage $a_{x,2}$, are added and at step S1016, the calculated nonlinear damage $a_{y,1}$ and the calculated nonlinear damage $a_{y,2}$, are added hereby to obtain the first polarization additive parameter and the second polarization additive parameter.

The above flow is illustrative, rather than restrictive. For example, sampling and calculating in the above description may be processed simultaneously; however, it may also sample all the samples need to be sampled, and then make corresponding calculation. In addition, the step illustrated in an order in the drawings may also be performed in parallel, or in a reversed order.

Figure 11:
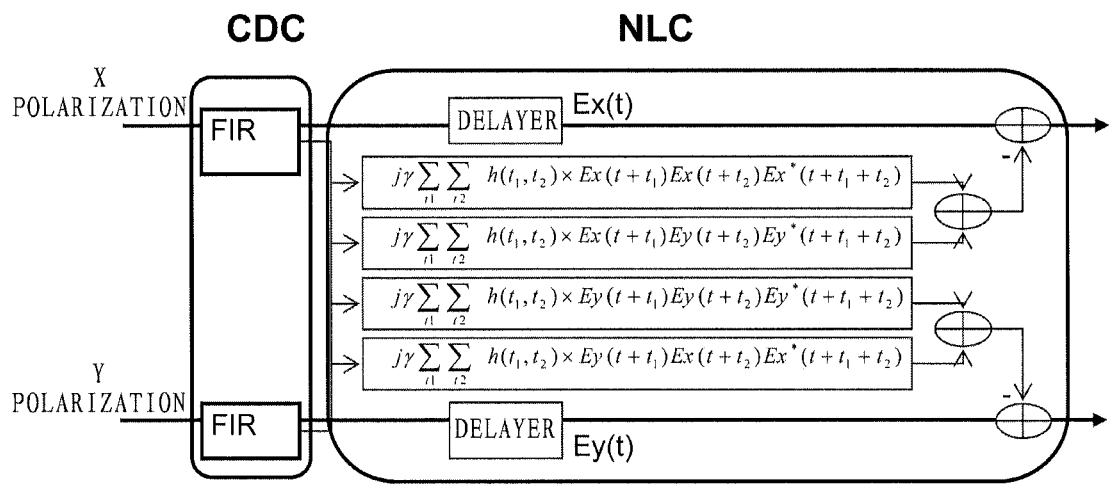
FIG. 11 illustrates a schematic structural diagram of a BP unit using NLC according to an embodiment.

FIG. 11 schematically illustrates a structural diagram BP unit using an NLC according to the above embodiment. CDC in this figure adopts or uses a finite impulse response (FIR) filter, however, it may also adopt other filters. The delayed time in delayer of the figure is fit in with the calculation time of each calculation unit. Besides, although the specific formulas used by processing operation are provided, obviously, other formulas may also be used.

Figure 12:
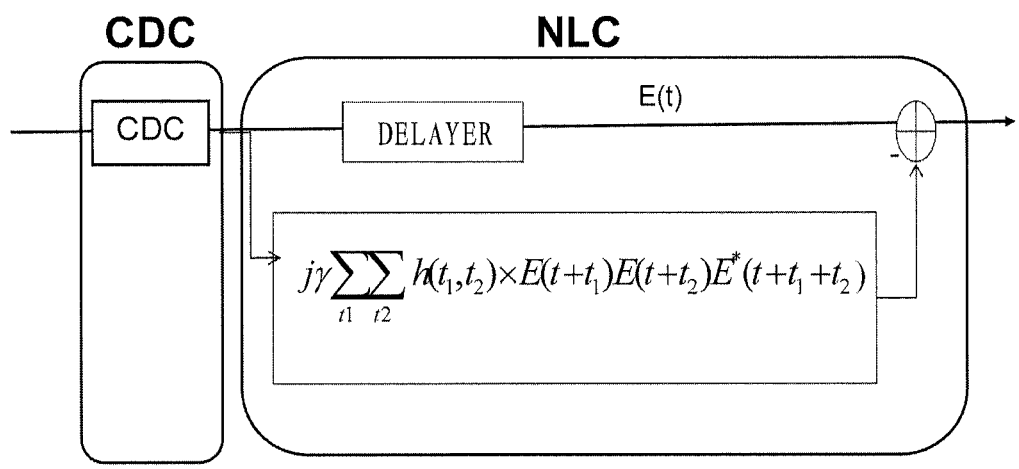
FIG. 12 illustrates a structural diagram of a BP unit according to another embodiment.

FIG. 12 schematically illustrates a structural diagram of a BP unit according to another embodiment. As shown in FIG. 12, it is suitable for single polarization; the additive parameter calculation unit 601 calculates a phase damage using the specific formulas in the figure.

It needs to be pointed out that a nonlinear damage calculator is used for a measurement for various nonlinear damages, not only could the output thereof serve as an input for a nonlinear damage eliminator to compensate a nonlinear damage, but also for other purposes. For example, the output may serve as a condition monitor of a transmission system; even it may be used in a simulation of a transmission system to simulate the impact of a nonlinear effect.

Figure 13:
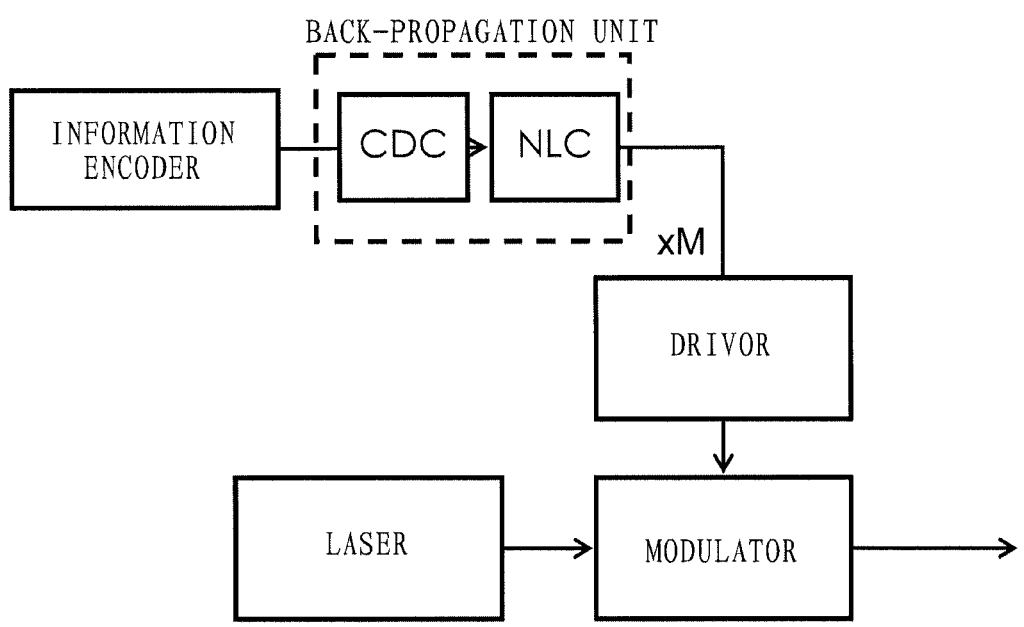
FIG. 13 illustrates a position of the BP unit in a transmitter.

The BP unit may also be used in a transmitter. FIG. 13 illustrates a position of the BP unit in a transmitter.

Figure 14:
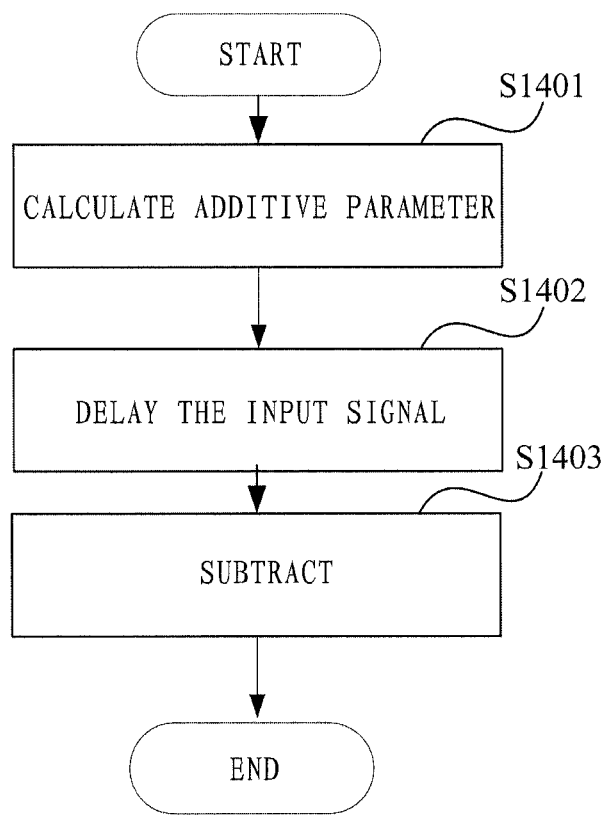
FIG. 14 illustrates a schematic flowchart of a nonlinear compensating method according to an embodiment.

FIG. 14 illustrates a schematic flowchart of a nonlinear compensating method according to an embodiment. As shown in FIG. 14, firstly, at step S1401, an additive parameter is calculated, meanwhile at step S1402, the input signal is delayed, and at step S1403, the additive parameter from delayed input signal is subtracted. The embodiment of these steps may refer to the preceding description of the apparatus.

According to the above description, the disclosure at least provides the embodiments as follows:

Excursus 1, a method for compensating nonlinear damage, including:

determining an additive parameter indicating an amount of nonlinear damage based on a plurality of sampled signal sets among which a sampling time of an input signal varies according to different time; delaying the input signal, and subtracting the additive parameter from the input signal.

Excursus 2, the method according to excursus 1, wherein determining the additive parameter comprises:

sampling by acquiring a plurality of first time samples and a plurality of second time samples under a first polarization state, as well as a plurality of first time samples and a plurality of second time samples under a second polarization state, wherein the plurality of first time samples under the first polarization state are samples with a sampling time of signal under the first polarization state varies according to a first time, the plurality of second time samples under the first polarization state are samples under the first polarization state whose sampling time varies according to a second time, the plurality of first time samples under the second polarization state are samples of signal under the second polarization state whose sampling time varies according to the first time, the plurality of second time samples under the second polarization state are samples of signal under the second polarization state whose sampling time varies according to the second time, and there is a certain functional relation between the first time and the second time;

calculating a nonlinear damage to the first polarization state per se by processing the plurality of first time samples and the plurality of second time samples under the first polarization state;

calculating a nonlinear damage from the second polarization state to the first polarization state by processing the plurality of first time samples and the plurality of second time samples under the first polarization state as well as the plurality of first time samples and the plurality of second time samples under the second polarization state;

calculating a nonlinear damage to the second polarization state per se by processing the plurality of first time samples and the plurality of second time samples under the second polarization state;

calculating a nonlinear damage from the first polarization state to the second polarization state by processing the plurality of first time samples and the plurality of second time samples under the first polarization state as well as the plurality of first time samples and the plurality of second time samples under the second polarization state;

adding the nonlinear damage to the first polarization state per se with the nonlinear damage from the second polarization state to the first polarization state; and adding the nonlinear damage to the second polarization state per se with the nonlinear damage from the first polarization state to the second polarization state.

Excursus 3, the method according to excursus 2, wherein the sampling collects two groups of plurality of signals at a time point that varies according to a time variable t1, calculating the nonlinear damage to the first polarization state per se according to an equation $$j\gamma \sum_{t1} h(t_1) \times Ex^2(t+t_1)Ex^*(t+2t_1),$$

wherein * represents a conjugation and h(t) is a weighting coefficient; Ex(t) represents a signal of time t under the first polarization state $$\sum_{t1}$$

represents a summation of all values for t1, j represents an imaginary part and r represents a nonlinear coefficient;

calculating the nonlinear damage from the second polarization state to the first polarization state according to an equation $$j\gamma \sum_{t1} h(t_1) \times Ex(t+t_1)Ey(t+t_1)Ey^*(t+2t_1);$$

calculating the nonlinear damage to the second polarization state per se according to an equation $$j\gamma \sum_{t1} h(t_1) \times Ey^2(t+t_1)Ey^*(t+2t_1);$$

and calculating the nonlinear damage from the first polarization state to the second polarization state according to an equation $$j\gamma \sum_{t1} h(t_1) \times Ey(t+t_1)Ex(t+t_1)Ex^*(t+2t_1).$$

Excursus 4, the method according to excursus 2, wherein the sampling collects two groups of plurality of signals at a time point that varies according to a time variable t1, calculating the nonlinear damage to the first polarization state per se according to an equation $$j\gamma \sum_{t1} h(t_1) \times Ex(t+t_1)Ex(t-t_1)Ex^*(t),$$

wherein * represents a conjugation and h(t) is a weighting coefficient; Ex(t) represents a signal of time t under the first polarization state, $$\sum_{t1}$$

represents a summation of all values for t1;

calculating the nonlinear damage from the second polarization state to the first polarization state according to an equation $$j\gamma \sum_{t1} h(t_1) \times Ex(t+t_1)Ey(t-t_1)Ey^*(t);$$

calculating the nonlinear damage to the second polarization state per se according to an equation $$j\gamma \sum_{t1} h(t_1) \times Ey(t+t_1)Ey(t-t_1)Ey^*(t);$$

and calculating the nonlinear damage from the first polarization state to the second polarization state according to an equation $$j\gamma \sum_{t1} h(t_1) \times Ey(t+t_1)Ex(t-t_1)Ex^*(t).$$

Excursus 5, the method according to excursus 2, wherein the step of determining the additive parameter comprises the steps of:

sampling by acquiring a plurality of first time samples, a plurality of second time samples and a plurality of third time samples under a first polarization state, as well as a plurality of first time samples, a plurality of second time samples and a plurality of third time samples under a second polarization state, wherein the plurality of first time samples under the first polarization state are samples of signal under the first polarization state whose sampling time varies according to a first time, the plurality of second time samples under the first polarization state are samples of signal under the first polarization state whose sampling time varies according to a second time, the plurality of third time samples under the first polarization state are samples whose sampling time varies according to a total time of the first time and the second time, the plurality of first time samples under the second polarization state are samples of signal under the second polarization state whose sampling time varies according to the first time, the plurality of second time samples under the second polarization state are samples of signal under the second polarization state whose sampling time varies according to the second time, the plurality of third time samples under the second polarization state are samples whose sampling time varies according to total time of the first time and the second time, and the first time and the second time are independent from each other;

calculating a nonlinear damage to the first polarization state per se by processing the plurality of first time samples, the plurality of second time samples and the plurality of third time samples under the first polarization state;

calculating a nonlinear damage from the second polarization state to the first polarization state by processing the plurality of first time samples, the plurality of second time samples and the plurality of third time samples under the first polarization state as well as the plurality of first time samples, the plurality of second time samples and the plurality of third time samples under the second polarization state;

calculating a nonlinear damage to the second polarization state per se by processing the plurality of first time samples, the plurality of second time samples and the plurality of third time samples under the second polarization state;

calculating a nonlinear damage from the first polarization state to the second polarization state by processing the plurality of first time samples, the plurality of second time samples and the plurality of third time samples under the first polarization state as well as the plurality of first time samples, the plurality of second time samples and the plurality of third time samples under the second polarization state.

Excursus 6, the method according to excursus 5, wherein calculating the nonlinear damage to the first polarization state per se calculates according to an equation $$j\gamma \sum_{t1} \sum_{t2} h(t_1, t_2) \times Ex(t+t_1) Ex(t+t_2) Ex^*(t+t_1+t_2),$$

wherein * represents a conjugation and h(t) is a weighting coefficient; Ex(t) represents a signal of time t under the first polarization state, $$\sum_{t1}$$

represents a summation of all values for t1, j represents an imaginary part and r represents a nonlinear coefficient;

calculating the nonlinear damage from the second polarization state to the first polarization state calculates according to an equation $$j\gamma \sum_{t1} \sum_{t2} h(t_1, t_2) \times Ex(t+t_1) Ey(t+t_2) Ey^*(t+t_1+t_2);$$

calculating the nonlinear damage to the second polarization state per se calculates according to an equation $$j\gamma \sum_{t1} \sum_{t2} h(t_1, t_2) \times Ey(t+t_1) Ey(t+t_2) Ey^*(t+t_1+t_2);$$

and calculating the nonlinear damage from the first polarization state to the second polarization state calculates according to an equation $$j\gamma \sum_{t1} \sum_{t2} h(t_1, t_2) \times Ey(t+t_1) Ey(t+t_2) Ey^*(t+t_1+t_2).$$

Excursus 7, an apparatus for compensating nonlinear damage, including:

an additive parameter determining unit configured to determine an additive parameter indicating an amount of nonlinear damage, based on a plurality of sampled signal sets in which a sampling time of an input signal varies according to different time;

a delaying unit, which delays the input signal; and a subtracting unit configured to subtract the additive parameter from the input signal.

Excursus 8, the apparatus according to excursus 7, wherein the additive parameter determining unit including:

a sampling unit configured to acquire a plurality of first time samples and a plurality of second time samples under a first polarization state, as well as a plurality of first time samples and a plurality of second time samples under a second polarization state, wherein the plurality of first time samples under the first polarization state are samples of signal under the first polarization state whose sampling time varies according to a first time, the plurality of second time samples under the first polarization state are samples of signal under the first polarization state whose sampling time varies according to a second time, the plurality of first time samples under the second polarization state are samples of signal under the second polarization state whose sampling time varies according to the first time, the plurality of second time samples under the second polarization state are samples of signal under the second polarization state whose sampling time varies according to the second time, and there is a certain functional relation between the first time and the second time;

a calculation unit for nonlinear damage to first polarization state per se, configured to calculate a nonlinear damage to the first polarization state per se by processing the plurality of first time samples and the plurality of second time samples under the first polarization state a calculation unit for nonlinear damage from second polarization state to first polarization state, configured to calculate a nonlinear damage from the second polarization state to the first polarization state by processing the plurality of first time samples and the plurality of second time samples under the first polarization state as well as the plurality of first time samples and the plurality of second time samples under the second polarization state;

a calculation unit for nonlinear damage to second polarization state per se, configured to calculate a nonlinear damage to the second polarization state per se by processing the plurality of first time samples and the plurality of second time samples under the second polarization state;

a calculation unit for nonlinear damage from first polarization state to second polarization state, configured to calculate a nonlinear damage from the first polarization state to the second polarization state by processing the plurality of first time samples and the plurality of second time samples under the first polarization state as well as the plurality of first time samples and the plurality of second time samples under the second polarization state;

a first adding unit configured to add the nonlinear damage to the first polarization state per se with the nonlinear damage from the second polarization state to the first polarization state; and a second adding unit configured to add the nonlinear damage to the second polarization state per se with the nonlinear damage from the first polarization state to the second polarization state.

Excursus 9, the apparatus according to excursus 7, wherein the additive parameter determining unit including:

a sampling unit configured to acquire a plurality of first time samples, a plurality of second time samples and a plurality of third time samples under a first polarization state, as well as a plurality of first time samples, a plurality of second time samples and a plurality of third time samples under a second polarization state, wherein the plurality of first time samples under the first polarization state are samples of signal under the first polarization state whose sampling time varies according to a first time, the plurality of second time samples under the first polarization state are samples of signal under the first polarization state whose sampling time varies according to a second time, the plurality of third time samples under the first polarization state are samples whose sampling time varies according to a total time of the first time and the second time, the plurality of first time samples under the second polarization state are samples of signal under the second polarization state whose sampling time varies according to the first time, the plurality of second time samples under the second polarization state are samples of signal under the second polarization state whose sampling time varies according to the second time, the plurality of third time samples under the second polarization state are samples whose sampling time varies according to total time of the first time and the second time, and the first time and the second time are independent from each other;

a calculation unit for nonlinear damage to first polarization state per se, configured to calculate a nonlinear damage to the first polarization state per se by processing the plurality of first time samples, the plurality of second time samples and the plurality of third time samples under the first polarization state;

a calculation unit for nonlinear damage from second polarization state to first polarization state, configured to calculate a nonlinear damage from the second polarization state to the first polarization state by processing the plurality of first time samples, the plurality of second time samples and the plurality of third time samples under the first polarization state as well as the plurality of first time samples, the plurality of second time samples and the plurality of third time samples under the second polarization state;

a calculation unit for nonlinear damage to second polarization state per se, configured to calculate a nonlinear damage to the second polarization state per se by processing the plurality of first time samples, the plurality of second time samples and the plurality of third time samples under the second polarization state;

a calculation unit for nonlinear damage from first polarization state to second polarization state, configured to calculate a nonlinear damage from the first polarization state to the second polarization state by processing the plurality of first time samples, the plurality of second time samples and the plurality of third time samples under the first polarization state as well as the plurality of first time samples, the plurality of second time samples and the plurality of third time samples under the second polarization state.

Excursus 10, the apparatus according to excursus 9, wherein the calculation unit for nonlinear damage to first polarization state per se calculates according to an equation $$j\gamma \sum_{t1} \sum_{t2} h(t_1, t_2) \times Ex(t+t_1)Ex(t+t_2)Ex^*(t+t_1+t_2),$$

wherein * represents a conjugation and h(t) is a weighting coefficient; Ex(t) represents a signal of time t under the first polarization state, $$\sum_{t1}$$

represents a summation of all values for t1, j represents an imaginary part and r represents a nonlinear coefficient;

the calculation unit for nonlinear damage from second polarization state to first polarization state calculates according to an equation $$j\gamma \sum_{t1} \sum_{t2} h(t_1, t_2) \times Ex(t+t_1)Ey(t+t_2)Ey^*(t+t_1+t_2);$$

the calculation unit for nonlinear damage to second polarization state per se calculates according to an equation $$j\gamma \sum_{t1} \sum_{t2} h(t_1, t_2) \times Ey(t+t_1)Ey(t+t_2)Ey^*(t+t_1+t_2);$$

and the calculation unit for nonlinear damage from first polarization state to second polarization state calculates according to an equation $$j\gamma \sum_{t1} \sum_{t2} h(t_1, t_2) \times Ey(t+t_1)Ex(t+t_2)Ex^*(t+t_1+t_2).$$

In the description of embodiments, the description for methods, steps may be helpful for understanding apparatus, units; the description for apparatus, units may be helpful for understanding methods, steps.

The apparatus and method may be embodied in hardware or in the combination of hardware and software, such as a computer. The embodiments relate to such computer readable programs that when executed by logic elements, may enable the logic elements to realize above apparatus or components, or may enable the logic elements to realize above step or method. The embodiments also relates to storage devices for storing computer programs, such as a hard disk, a magnetic disk, CD-ROM, DVD, or flash, magnetooptic disk, memory card, storage rod etc.

Although the invention has been shown and described with respect to certain preferred embodiments, the foregoing detailed description are exemplary and are not restrictive of the invention. As should be aware to a person skilled in the art, it is possible to make various variations and modifications according to the spirit of the present invention, all such variations and modifications is covered by the scope of the present invention.

The invention claimed is:

1. A method for compensating nonlinear damage, comprising:
   determining an additive parameter indicating an amount of nonlinear damage based on a plurality of sampled signal sets among which a sampling time of an input signal varies according to different time; and
   subtracting the additive parameter from the input signal.

2. The method according to claim 1, wherein the determining the additive parameter comprises:

sampling by acquiring a plurality of first time samples and a plurality of second time samples under a first polarization state, as well as a plurality of first time samples and a plurality of second time samples under a second polarization state, wherein the plurality of first time samples under the first polarization state are samples of signals under the first polarization state whose sampling time varies according to a first time, the plurality of second time samples under the first polarization state are samples of signals under the first polarization state whose sampling time varies according to a second time, the plurality of first time samples under the second polarization state are samples of signals under the second polarization state whose sampling time varies according to the first time, the plurality of second time samples under the second polarization state are samples of signals under the second polarization state whose sampling time varies according to the second time, and there is a functional relation between the first time and the second time;

calculating a nonlinear damage to the first polarization state by processing the plurality of first time samples and the plurality of second time samples under the first polarization state;

calculating a nonlinear damage from the second polarization state to the first polarization state by processing the plurality of first time samples and the plurality of second time samples under the first polarization state as well as the plurality of first time samples and the plurality of second time samples under the second polarization state;

calculating a nonlinear damage to the second polarization state by processing the plurality of first time samples and the plurality of second time samples under the second polarization state;

calculating a nonlinear damage from the first polarization state to the second polarization state by processing the plurality of first time samples and the plurality of second time samples under the first polarization state as well as the plurality of first time samples and the plurality of second time samples under the second polarization state;

adding the nonlinear damage to the first polarization state with the nonlinear damage from the second polarization state to the first polarization state; and adding the nonlinear damage to the second polarization state with the nonlinear damage from the first polarization state to the second polarization state.

3. The method according to claim 2, wherein the sampling collects two groups of plurality of signals at a time point that varies in a time variable t1, calculating the nonlinear damage to the first polarization state per se according to an equation $$j\gamma \sum_{t1} h(t_1) \times Ex^2(t+t_1)Ex^*(t+2t_1),$$

wherein * represents a conjugation and h(t) is a weighting coefficient; Ex(t) represents a signal of time t under the first polarization state, $$\sum_{t1}$$

represents a summation of all values for t1, j represents an imaginary part and r represents a nonlinear coefficient;

calculating the nonlinear damage from the second polarization state to the first polarization state according to an equation $$j\gamma \sum_{t1} h(t_1) \times Ex(t+t_1)Ey(t+t_1)Ey^*(t+2t_1);$$

calculating the nonlinear damage to the second polarization state per se according to an equation $$j\gamma \sum_{t1} h(t_1) \times Ey^2(t+t_1)Ey^*(t+2t_1);$$

and calculating the nonlinear damage from the first polarization state to the second polarization state according to an equation $$j\gamma \sum_{t1} h(t_1) \times Ey(t+t_1)Ex(t+t_1)Ex^*(t+2t_1).$$

4. The method according to claim 2, wherein the sampling collects two groups of plurality of signals at a time point that varies in a time variable t1, calculating the nonlinear damage to the first polarization state per se according to an equation $$j\gamma \sum_{t1} h(t_1) \times Ex(t+t_1)Ex(t-t_1)Ex^*(t),$$

wherein * represents a conjugation and h(t) is a weighting coefficient; Ex(t) represents a signal of time t under the first polarization state, $$\sum_{t1}$$

represents a summation of all values for t1;

calculating the nonlinear damage from the second polarization state to the first polarization state according to an equation $$j\gamma \sum_{t1} h(t_1) \times Ex(t+t_1)Ey(t-t_1)Ey^*(t);$$

calculating the nonlinear damage to the second polarization state per se according to an equation $$j\gamma \sum_{t1} h(t_1) \times Ey(t+t_1)Ey(t-t_1)Ey^*(t);$$

and calculating the nonlinear damage from the first polarization state to the second polarization state according to an equation $$j\gamma \sum_{t1} h(t_1) \times Ey(t+t_1)Ex(t-t_1)Ex^*(t).$$

5. The method according to claim 2, wherein the determining the additive parameter comprises:
sampling by acquiring a plurality of first time samples, a plurality of second time samples and a plurality of third time samples under a first polarization state, as well as a plurality of first time samples, a plurality of second time samples and a plurality of third time samples under a second polarization state, wherein the plurality of first time samples under the first polarization state are samples of signals under the first polarization state whose sampling time varies according to a first time, the plurality of second time samples under the first polarization state are samples of signals under the first polarization state whose sampling time varies according to a second time, the plurality of third time samples under the first polarization state are samples whose sampling time varies according to a total time of the first time and the second time, the plurality of first time samples under the second polarization state are samples of signals under the second polarization state whose sampling time varies according to the first time, the plurality of second time samples under the second polarization state are samples of signals under the second polarization state whose sampling time varies according to the second time, the plurality of third time samples under the second polarization state are samples whose sampling time varies according to total time of the first time and the second time, and the first time and the second time are independent from each other;
calculating a nonlinear damage to the first polarization state by processing the plurality of first time samples, the plurality of second time samples and the plurality of third time samples under the first polarization state;
calculating a nonlinear damage from the second polarization state to the first polarization state by processing the plurality of first time samples, the plurality of second time samples and the plurality of third time samples under the first polarization state as well as the plurality of first time samples, the plurality of second time samples and the plurality of third time samples under the second polarization state;
calculating a nonlinear damage to the second polarization state by processing the plurality of first time samples, the plurality of second time samples and the plurality of third time samples under the second polarization state;
calculating a nonlinear damage from the first polarization state to the second polarization state by processing the plurality of first time samples, the plurality of second time samples and the plurality of third time samples under the first polarization state as well as the plurality of first time samples, the plurality of second time samples and the plurality of third time samples under the second polarization state.

6. The method according to claim 5, wherein
calculating the nonlinear damage to the first polarization state calculates according to an equation $$j\gamma \sum_{t1} \sum_{t2} h(t_1, t_2) \times Ex(t+t_1)Ex(t+t_2)Ex^*(t+t_1+t_2),$$

wherein * represents a conjugation and h(t) is a weighting coefficient; Ex(t) represents a signal of time t under the first polarization state, $$\sum_{t1}$$

represents a summation of all values for t1, j represents an imaginary part and r represents a nonlinear coefficient;
calculating the nonlinear damage from the second polarization state to the first polarization state calculates according to an equation $$j\gamma \sum_{t1} \sum_{t2} h(t_1, t_2) \times Ex(t+t_1)Ey(t+t_2)Ey^*(t+t_1+t_2);$$

the step of calculating the nonlinear damage to the second polarization state per se calculates according to an equation $$j\gamma \sum_{t1} \sum_{t2} h(t_1, t_2) \times Ey(t+t_1)Ey(t+t_2)Ey^*(t+t_1+t_2);$$

and calculating the nonlinear damage from the first polarization state to the second polarization state calculates according to an equation $$j\gamma \sum_{t1} \sum_{t2} h(t_1, t_2) \times Ey(t+t_1)Ey(t+t_2)Ey^*(t+t_1+t_2).$$

7. An apparatus for compensating nonlinear damage, comprising:
an additive parameter determining unit configured to determine an additive parameter indicating an amount of nonlinear damage, based on a plurality of sampled signal sets in which a sampling time of an input signal varies in different time; and
a subtracting unit configured to subtract the additive parameter from the input signal.

8. The apparatus according to claim 7, wherein the additive parameter determining unit comprising:
a sampling unit configured to acquire a plurality of first time samples and a plurality of second time samples under a first polarization state, as well as a plurality of first time samples and a plurality of second time samples under a second polarization state, wherein the plurality of first time samples under the first polarization state are samples of signals under the first polarization state whose sampling time varies according to a first time, the plurality of second time samples under the first polarization state are samples of signals under the first polarization state whose sampling time varies according to a second time, the plurality of first time samples under the second polarization state are samples of signals under the second polarization state whose sampling time varies according to the first time, the plurality of second time samples under the second polarization state are samples of signals under the second polarization state whose sampling time varies according to the second time, and there is a functional relation between the first time and the second time;

a calculation unit for nonlinear damage to first polarization state, configured to calculate a nonlinear damage to the first polarization state by processing the plurality of first time samples and the plurality of second time samples under the first polarization state a calculation unit for nonlinear damage from second polarization state to first polarization state, configured to calculate a nonlinear damage from the second polarization state to the first polarization state by processing the plurality of first time samples and the plurality of second time samples under the first polarization state as well as the plurality of first time samples and the plurality of second time samples under the second polarization state;

a calculation unit for nonlinear damage to second polarization state, configured to calculate a nonlinear damage to the second polarization state by processing the plurality of first time samples and the plurality of second time samples under the second polarization state;

a calculation unit for nonlinear damage from first polarization state to second polarization state, configured to calculate a nonlinear damage from the first polarization state to the second polarization state by processing the plurality of first time samples and the plurality of second time samples under the first polarization state as well as the plurality of first time samples and the plurality of second time samples under the second polarization state;

a first adding unit configured to add the nonlinear damage to the first polarization state with the nonlinear damage from the second polarization state to the first polarization state; and a second adding unit configured to add the nonlinear damage to the second polarization state with the nonlinear damage from the first polarization state to the second polarization state.

9. The apparatus according to claim 7, wherein the additive parameter determining unit comprising:

a sampling unit configured to acquire a plurality of first time samples, a plurality of second time samples and a plurality of third time samples under a first polarization state, as well as a plurality of first time samples, a plurality of second time samples and a plurality of third time samples under a second polarization state, wherein the plurality of first time samples under the first polarization state are samples of signals under the first polarization state whose sampling time varies according to a first time, the plurality of second time samples under the first polarization state are samples of signals under the first polarization state whose sampling time varies according to a second time, the plurality of third time samples under the first polarization state are samples whose sampling time varies according to a total time of the first time and the second time, the plurality of first time samples under the second polarization state are samples of signals under the second polarization state whose sampling time varies according to the first time, the plurality of second time samples under the second polarization state are samples of signals under the second polarization state whose sampling time varies according to the second time, the plurality of third time samples under the second polarization state are samples whose sampling time varies according to total time of the first time and the second time, and the first time and the second time are independent from each other;

a calculation unit for nonlinear damage to first polarization state, configured to calculate a nonlinear damage to the first polarization state by processing the plurality of first time samples, the plurality of second time samples and the plurality of third time samples under the first polarization state;

a calculation unit for nonlinear damage from second polarization state to first polarization state, configured to calculate a nonlinear damage from the second polarization state to the first polarization state by processing the plurality of first time samples, the plurality of second time samples and the plurality of third time samples under the first polarization state as well as the plurality of first time samples, the plurality of second time samples and the plurality of third time samples under the second polarization state;

a calculation unit for nonlinear damage to second polarization state, configured to calculate a nonlinear damage to the second polarization state by processing the plurality of first time samples, the plurality of second time samples and the plurality of third time samples under the second polarization state;

a calculation unit for nonlinear damage from first polarization state to second polarization state, configured to calculate a nonlinear damage from the first polarization state to the second polarization state by processing the plurality of first time samples, the plurality of second time samples and the plurality of third time samples under the first polarization state as well as the plurality of first time samples, the plurality of second time samples and the plurality of third time samples under the second polarization state.

10. The apparatus according to claim 9, wherein the calculation unit for nonlinear damage to first polarization state per se calculates according to an equation $$j\gamma \sum_{t1} \sum_{t2} h(t_1, t_2) \times Ex(t+t_1) Ex(t+t_2) Ex^*(t+t_1+t_2),$$

wherein * represents a conjugation and h(t) is a weighting coefficient; Ex(t) represents a signal of time t under the first polarization state, $$\sum_{t1}$$

represents a summation of all values for t1, j represents an imaginary part and r represents a nonlinear coefficient;

the calculation unit for nonlinear damage from second polarization state to first polarization state calculates according to an equation $$j\gamma \sum_{t1} \sum_{t2} h(t_1, t_2) \times Ex(t+t_1)Ey(t+t_2)Ey^*(t+t_1+t_2);$$

the calculation unit for nonlinear damage to second polarization state per se calculates according to an equation $$j\gamma \sum_{t1} \sum_{t2} h(t_1, t_2) \times Ey(t+t_1)Ey(t+t_2)Ey^*(t+t_1+t_2);$$

and the calculation unit for nonlinear damage from first polarization state to second polarization state calculates according to an equation $$j\gamma \sum_{t1} \sum_{t2} h(t_1, t_2) \times Ey(t+t_1)Ex(t+t_2)Ex^*(t+t_1+t_2).$$

* * * * *